US010672291B2

(12) United States Patent
Raimondi

(10) Patent No.: US 10,672,291 B2
(45) Date of Patent: Jun. 2, 2020

(54) APPARATUS FOR IMPROVING THE TECHNICAL ABILITY RELATED TO THE USE OF A MUSICAL INSTRUMENT, IN PARTICULAR FOR TRAINING THE FINGERS OF A HAND

(71) Applicant: Daniele Raimondi, Milan (IT)

(72) Inventor: Daniele Raimondi, Milan (IT)

( * ) Notice: Subject to any disclaimer, the term of this patent is extended or adjusted under 35 U.S.C. 154(b) by 0 days.

(21) Appl. No.: 16/302,667

(22) PCT Filed: May 17, 2017

(86) PCT No.: PCT/IB2017/000584
§ 371 (c)(1),
(2) Date: Nov. 18, 2018

(87) PCT Pub. No.: WO2017/199081
PCT Pub. Date: Nov. 23, 2017

(65) Prior Publication Data
US 2019/0295435 A1 Sep. 26, 2019

(30) Foreign Application Priority Data
May 18, 2016 (IT) .............................. UA2016A3562

(51) Int. Cl.
*G09B 15/06* (2006.01)
*G10D 3/00* (2020.01)
(Continued)

(52) U.S. Cl.
CPC .......... *G09B 15/06* (2013.01); *A63B 21/0428* (2013.01); *A63B 21/4019* (2015.10);
(Continued)

(58) Field of Classification Search
CPC . G09B 15/06; G10D 3/00; G10G 7/00; A63B 23/16; A63B 21/0555; A63B 21/0557; A63B 23/03508
(Continued)

(56) References Cited

U.S. PATENT DOCUMENTS 494,197 A * 3/1893 Hall ........................ A63B 23/16
482/48
1,736,930 A * 11/1929 Marsh .................... A63B 23/16
482/48
(Continued)

OTHER PUBLICATIONS

International Search Report for PCT/162017/000584 dated Sep. 6, 2017.
(Continued)

*Primary Examiner* — David S Warren
*Assistant Examiner* — Christina M Schreiber
(74) *Attorney, Agent, or Firm* — Hedman & Costigan, P.C.; James V. Costigan; Kathleen A. Costigan

(57) ABSTRACT

An apparatus for improving technical ability related to the use of a musical instrument, in particular for finger exercise, comprising a bearing structure that can be mated to the back of the hand of a user by removable fastening means; the apparatus further comprises a movable component, constituted by one or more rings, each of which is designed to be associated with a phalanx of a finger of the hand, each ring being connected to the bearing structure by elastic means; the apparatus finds application both in the development of technical ability related to the use of any musical instrument, with particular effectiveness on stringed instruments, and in the medical field in rehabilitation therapy for use of the hand.

4 Claims, 2 Drawing Sheets

(51) Int. Cl.
*G10G 7/00* (2006.01)
*A63B 23/16* (2006.01)
*A63B 21/00* (2006.01)
*A63B 21/04* (2006.01)
*A63B 21/055* (2006.01)
*A63B 23/035* (2006.01)

(52) U.S. Cl.
CPC .......... *A63B 23/16* (2013.01); *A63B 21/0555* (2013.01); *A63B 21/0557* (2013.01); *A63B 23/03508* (2013.01); *G10D 3/00* (2013.01); *G10G 7/00* (2013.01)

(58) Field of Classification Search
USPC .......................................................... 84/465
See application file for complete search history.

(56) References Cited

U.S. PATENT DOCUMENTS

| | | | | |
|---|---|---|---|---|
| 2,222,180 A * | 11/1940 | Marsh | A63B 23/16 | 84/468 |
| 3,747,593 A * | 7/1973 | Taylor | A63B 21/0004 | 601/40 |
| 4,765,608 A * | 8/1988 | Bonasera | A63B 23/16 | 482/124 |
| 4,875,469 A * | 10/1989 | Brook | A61H 1/0288 | 601/40 |
| 5,373,585 A * | 12/1994 | Wiggins | A41D 19/00 | 2/159 |
| 5,447,490 A * | 9/1995 | Fula | A63B 21/0004 | 482/124 |
| 5,697,103 A * | 12/1997 | Wiggins | A41D 19/0048 | 2/159 |
| 5,820,577 A * | 10/1998 | Taylor | A63B 21/0004 | 601/40 |
| 6,213,918 B1 * | 4/2001 | Rogers, Jr. | A63B 21/0004 | 482/124 |
| 6,450,924 B1 * | 9/2002 | Block | A63B 21/0004 | 482/44 |
| 7,273,463 B2 * | 9/2007 | Priore | A63B 21/0004 | 2/163 |
| 7,731,633 B1 * | 6/2010 | Williams | A63B 21/0552 | 482/148 |
| 7,740,561 B2 * | 6/2010 | Kupferman | A63B 21/0004 | 482/148 |
| 7,914,476 B2 * | 3/2011 | Ball | A61F 5/0118 | 128/846 |
| 8,678,980 B2 * | 3/2014 | Land | A63B 21/00065 | 482/47 |
| D787,515 S * | 5/2017 | Friedman | D14/388 | |
| 9,764,190 B2 * | 9/2017 | Hoffman | A63B 23/16 | |
| 10,269,263 B2 * | 4/2019 | Carrick | G09B 15/06 | |
| 10,388,180 B1 * | 8/2019 | Dayan | A63B 21/02 | |
| 2006/0247102 A1 * | 11/2006 | Kupferman | A63B 21/0004 | 482/44 |
| 2013/0338556 A1 * | 12/2013 | Hoffman | A63B 23/16 | 602/22 |
| 2015/0202514 A1 * | 7/2015 | Ervin | A63B 69/0071 | 473/450 |
| 2018/0214742 A1 * | 8/2018 | Harrison | A47B 21/0371 | |
| 2019/0295435 A1 * | 9/2019 | Raimondi | G09B 15/06 | |

OTHER PUBLICATIONS

Written Opinion of the International Searching Authority dated Sep. 6, 2017.

* cited by examiner

APPARATUS FOR IMPROVING THE TECHNICAL ABILITY RELATED TO THE USE OF A MUSICAL INSTRUMENT, IN PARTICULAR FOR TRAINING THE FINGERS OF A HAND

BACKGROUND OF INVENTION

The subject of the present invention is an apparatus for improving the technical ability related to the use of a musical instrument, in particular for finger exercise.

The apparatus for finger exercise according to the present invention has been especially designed for the development of technical ability related to the use of any musical instrument, with particular effectiveness on stringed instruments, and for rehabilitation therapy for use of the hand, in the medical field.

There are known devices and instruments able to improve finger mobility and force, however none of the products currently on the market intended for improving technical ability related to the use of a stringed instrument allow the person using them to actually play the musical instrument and exercise at the same time.

SUMMARY OF INVENTION

The aim of the present invention is to provide an apparatus for finger exercise, especially designed for improving technical ability related to the use of a musical instrument and that can be used while playing the instrument.

Within the scope of this aim, one object of the invention is to provide an apparatus for finger exercise that is also advantageously usable in the medical field, in rehabilitation therapy for use of the hand.

Another object of the invention is to provide a versatile apparatus that can be made available in a variety of configurations.

A further object of the present invention is to provide an apparatus that can be produced using common, commercially available items and materials and which is also competitive from the economic standpoint.

This apparatus, due to its unique constructional characteristics, is able to ensure the broadest possible guarantees of reliability and safety in use.

These and other objects, which will be described in greater detail hereinafter, are achieved by an apparatus for improving technical ability related to the use of a musical instrument, in particular for finger exercise, characterized in that it comprises a bearing structure that can be mated to the back of the hand of a user by removable fastening means, said apparatus also comprising a movable component, constituted by one or more rings, each of which is designed to be associated with a phalanx of a finger of the hand, with each ring being connected to said bearing structure by elastic means.

BRIEF DESCRIPTION OF DRAWINGS

Further characteristics and advantages of the subject of the present invention will become clearer through examination of the description of a preferred, but not exclusive, embodiment of the invention, shown by way of indicative and non-limitative example in the accompanying drawings, in which.

DESCRIPTION OF PREFERRED EMBODIMENTS

Figure 1:
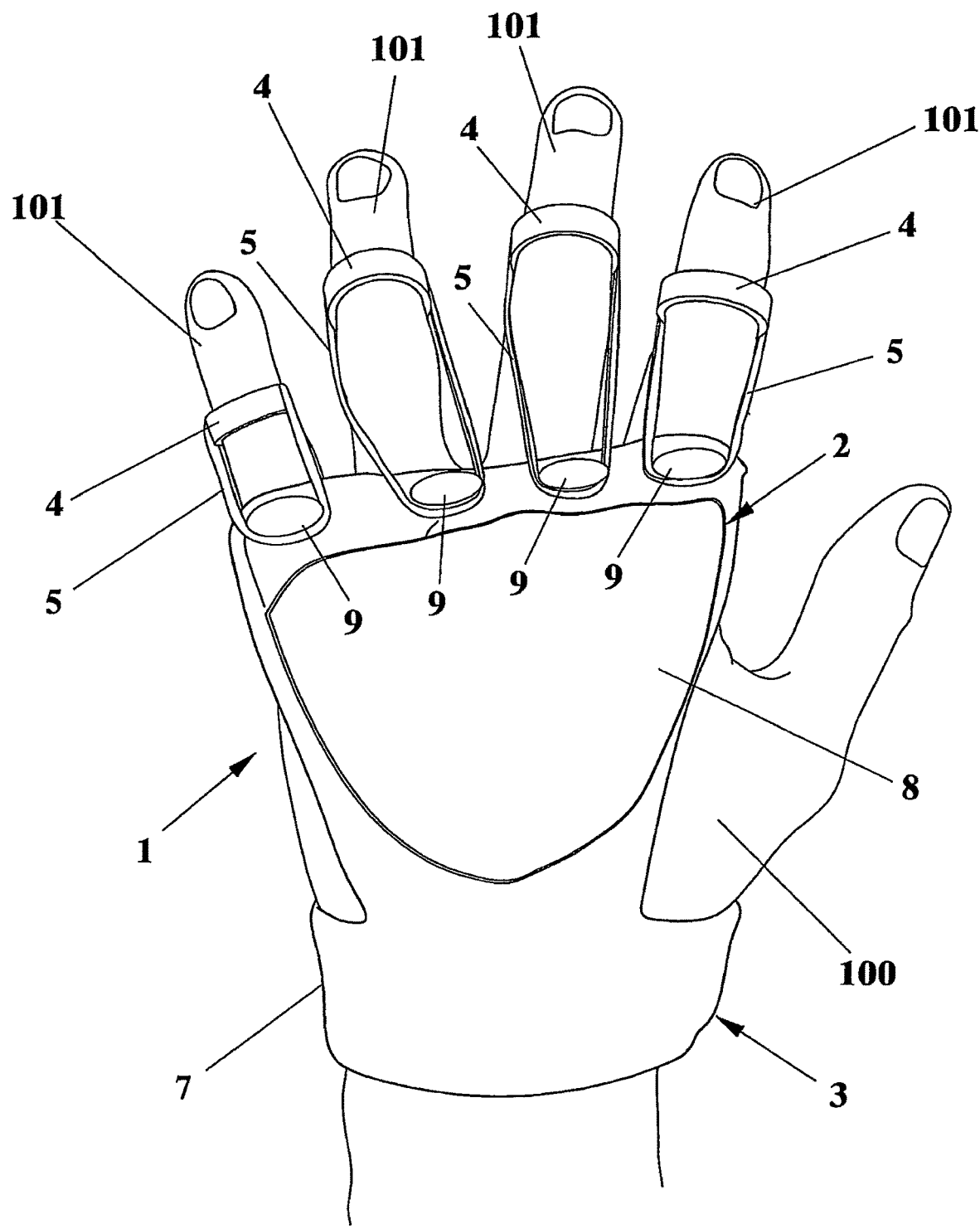
FIG. 1 is a perspective view of the apparatus shown in a use condition thereof, applied to the hand of a user.

With particular reference to the numerical symbols in the aforementioned figures, the apparatus for finger exercise according to the invention, indicated as a whole by reference numeral 1, comprises a bearing structure, indicated as a whole by reference numeral 2, which can be mated to the back of the hand 100 of a user, by removable fastening means 3.

The apparatus also comprises a movable component, constituted by one or more rings 4, each of which is designed to be associated with a phalanx 101 of a finger of the hand 100.

Each ring 4 is connected to the bearing structure 2 by elastic means.

Figure 2:
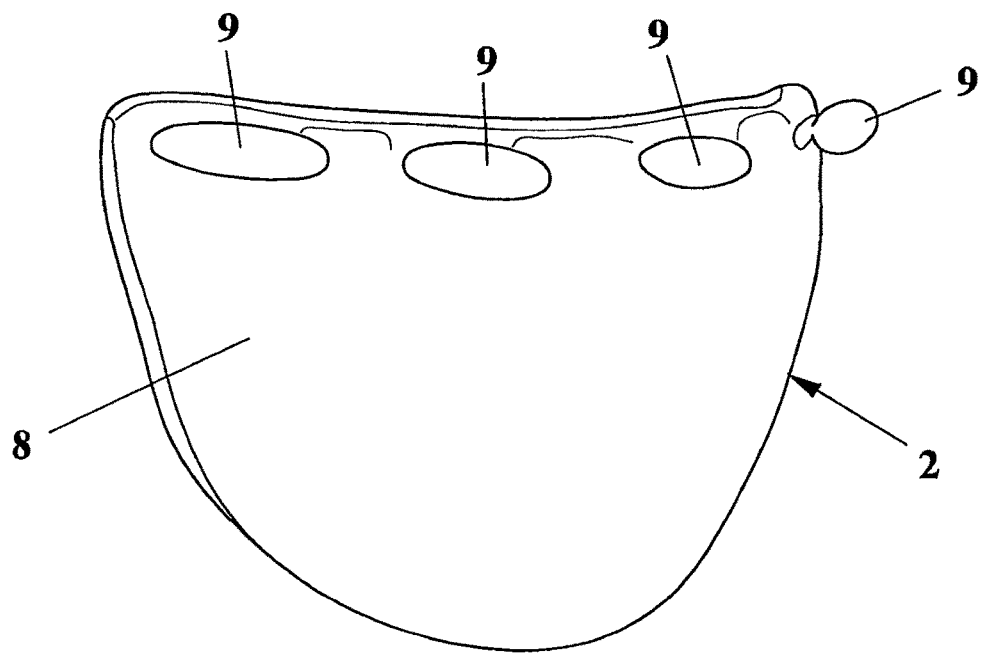
FIG. 2 is a perspective view showing the top side of the bearing structure.

As better seen in FIG. 2, the bearing structure 2 is formed by a flexible part that rests on the back of the hand, extending frontward at the knuckles and rearward at the wrist.

The bearing structure 2 is fastened to the wrist by a cuff 7 with an adjustable closing system.

A shell-shaped rigid plate 8 is mounted on the back of the bearing structure 2.

The rigid plate 8 has a series of pegs 9 arranged in correspondence to each finger of the hand 100.

The pegs 9 are arranged in correspondence to each finger of the hand.

A closed loop elastic band 5 is made to pass around each peg 9, the opposite end of this band being anchored to a respective ring 4 worn on the second phalanx 101 of each finger of the hand 100 so that, under tension, each elastic band becomes positioned to the left and to the right of the finger on which it is anchored, leaving the latter free to bend at will.

As can be seen in the embodiment shown in FIG. 1, the thumb is free to grasp the neck of a stringed instrument, as are the palm, wrist and fingers of the hand also free to move.

Figure 3:
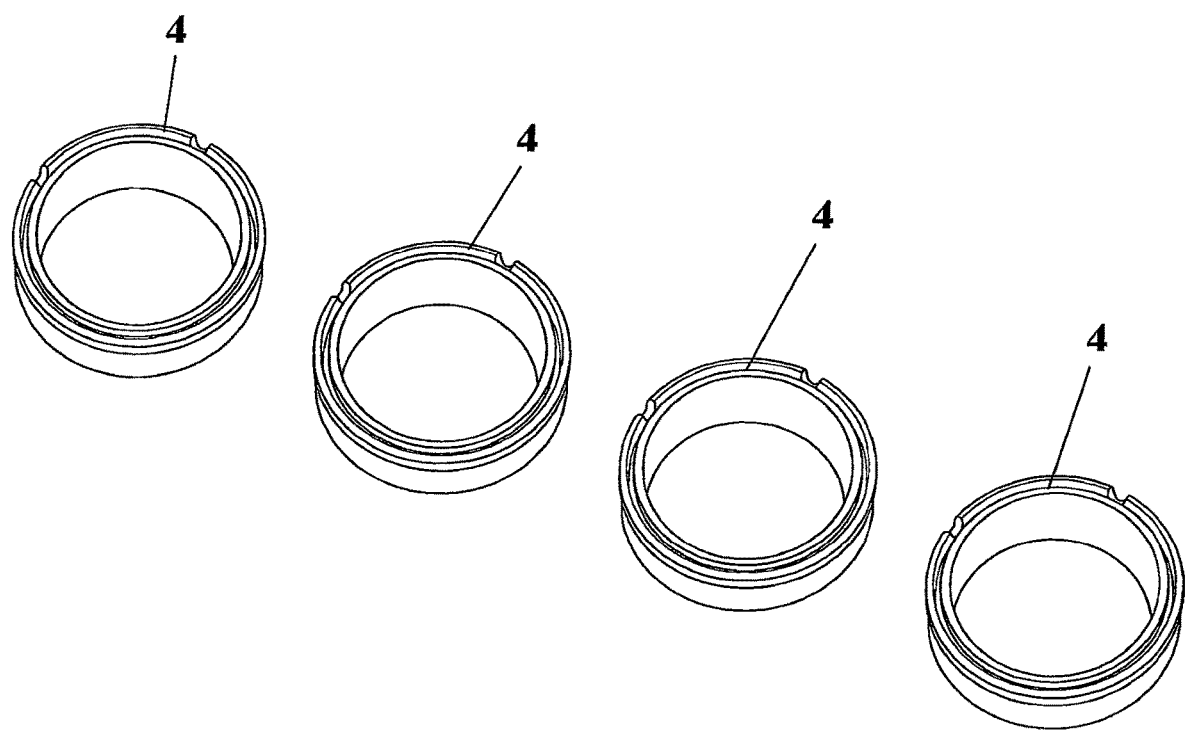
FIG. 3 is a perspective view showing four rings.

FIG. 3 shows the rings 4 to be put on the second phalanx 101 of the fingers of the hand 100.

The rings 4 have varying diameter according to the size of the fingers of the hand 100.

A first application of the invention consists in using it for the development of technical ability related to the use of a musical instrument, with special regard to stringed instruments.

This application contemplates a configuration of the apparatus with four elastic bands and four rings to put on the second phalanx of the index, middle, ring and little fingers, leaving the thumb free to allow anyone who wears the apparatus to simultaneously grasp the fingerboard of any stringed instrument without any hindrance or obstruction by the apparatus.

This is possible because the structure of the apparatus for finger exercise does not affect either the palm or, in the assumed application being described, the thumb of the hand on which it is applied.

Instead, for keyboard instruments such as the piano, a configuration of the apparatus is contemplated with five annular elastic bands and five rings to put on the second phalanx of each of the five digits of the hand on which the apparatus for finger exercise is applied.

In this way, all five digits of the hand can be exercised simultaneously, keeping the palm completely free to rest on the keyboard of an instrument such as, for example, a piano.

A second application of the invention provides for use in the rehabilitation of the joints of the hand.

This application contemplates a configuration of the apparatus with a minimum of one to a maximum of five closed loop elastic bands and a minimum of one to a maximum of five rings to place on the second phalanx of the digits of the hand on which the apparatus for finger exercise is applied.

In this way, only one digit or groups of digits or all the digits of a hand can be exercised to favour rehabilitation of the joints and strengthening their force and resistance.

In practice, it has been found that the invention achieves the intended aim and objects.

An apparatus for finger exercise has in fact been produced that is constructively simple, easy to assemble and constituted by readily available materials.

This apparatus is versatile, as it can be provided in a variety of configurations and with different tension and elasticity levels for the elastic bands.

This apparatus appears to be the first article conceived to improve technical ability related to the use of a musical instrument that can be used while playing the instrument.

None of the products currently on the market and intended for improving technical ability related to the use of a stringed instrument allow those using them to actually play the musical instrument and exercise simultaneously, as, on the contrary, is allowed by the present invention.

Naturally, the materials used, as well as the dimensions, can vary according to requirements.

The invention claimed is:

1. An apparatus for finger exercise, comprising a bearing structure (2), which can be mated to a back of a hand (100) of a user by removable fastening means (3); said apparatus further comprising a movable component constituted by one or more rings (4), each of which is designed to be associated with a phalanx (101) of a finger of said hand (100); and with each ring (4) being connected to said bearing structure (2) by elastic means; said bearing structure (2) being formed by a flexible part that rests on the back of said hand (100), extending frontward at knuckles of said hand (100) and rearward at a wrist; said bearing structure (2) having a series of pegs (9) in an area corresponding to said knuckles of said hand (100); said pegs (9) being in correspondence to each finger of said hand (100); said elastic means comprising a closed loop elastic band (5) being made to pass around each peg (9), the other end of said closed loop elastic band (5) being anchored to a respective ring (4) worn on a second phalanx (101) of each finger of said hand (100) so that, under tension, each closed loop elastic band (5) becomes positioned to the left and to the right of the finger on which it is anchored, leaving said finger on which it is anchored free to bend at will.

2. An apparatus, according to claim 1, characterized in that said bearing structure (2) is fastened to said wrist by a cuff (7) with an adjustable closing system.

3. An apparatus, according to claim 2, characterized in that a shell-shaped rigid plate (8) is mounted on a back of said bearing structure (2), said shell-shaped rigid plate (8) having said pegs (9) in an area corresponding to the knuckles of said hand (100).

4. An apparatus, according to claim 1, characterized in that said apparatus is used for the development of technical ability related to a use of a musical instrument, with special regard to stringed instruments, said structure comprising four elastic bands and four rings to place on a second phalanx of an index, middle, ring and little fingers, leaving a thumb free to allow anyone who wears said apparatus to simultaneously grasp a fingerboard of any stringed instrument without any hindrance or obstruction by said apparatus.

\* \* \* \* \*